US012300981B2

(12) United States Patent
Takahashi et al.

(10) Patent No.: US 12,300,981 B2
(45) Date of Patent: May 13, 2025

(54) WIRE HARNESS AND CABLE WATERPROOF STRUCTURE

(71) Applicant: Hitachi Metals, Ltd., Tokyo (JP)

(72) Inventors: Noriyuki Takahashi, Tokyo (JP); Takahiro Futatsumori, Tokyo (JP)

(73) Assignee: Proterial, Ltd., Tokyo (JP)

( * ) Notice: Subject to any disclaimer, the term of this patent is extended or adjusted under 35 U.S.C. 154(b) by 0 days.

(21) Appl. No.: 17/902,570

(22) Filed: Sep. 2, 2022

(65) Prior Publication Data

US 2023/0083925 A1  Mar. 16, 2023

(30) Foreign Application Priority Data

Sep. 7, 2021 (JP) .................... 2021-145214

(51) Int. Cl.
*H02G 15/013* (2006.01)
*B60R 16/02* (2006.01)
*H02G 15/04* (2006.01)

(52) U.S. Cl.
CPC ....... *H02G 15/013* (2013.01); *B60R 16/0222* (2013.01); *H02G 15/043* (2013.01)

(58) Field of Classification Search
CPC ... H01B 17/583; H02G 15/013; H02G 15/043
USPC .............. 174/75 B, 77 R, 82, 74 A, 93
See application file for complete search history.

(56) References Cited

U.S. PATENT DOCUMENTS

| 7,955,108 | B2 * | 6/2011 | Jonli ................... H05B 3/06 |
| | | | 174/74 A |
| 9,240,261 | B2 * | 1/2016 | Bernhardt ......... G02B 6/4471 |
| 9,905,337 | B2 * | 2/2018 | Komori ............... H01B 7/282 |
| 10,148,078 | B2 | 12/2018 | Komori et al. |
| 10,355,469 | B2 | 7/2019 | Komori et al. |
| 10,821,920 | B2 * | 11/2020 | Murata ................ H01B 7/00 |
| 11,329,422 | B2 * | 5/2022 | Komori ............... H01R 13/72 |
| 2011/0181002 | A1 * | 7/2011 | Fujita ............... H02G 15/013 |
| | | | 277/616 |
| 2015/0287497 | A1 * | 10/2015 | Shiga ............... B60R 16/0215 |
| | | | 174/84 R |
| 2018/0316174 | A1 | 11/2018 | Komori et al. |

(Continued)

FOREIGN PATENT DOCUMENTS

| JP | 2017-093185 A | 5/2017 |
| JP | 2017-112756 A | 6/2017 |
| JP | 2020-087786 | * 6/2020 |

*Primary Examiner* — Chau N Nguyen
(74) *Attorney, Agent, or Firm* — Studebaker Brackett PLLC

(57) ABSTRACT

A wire harness is provided with a cable including wires coated with a sheath, a rubber stopper that covers an end of the sheath together with a portion in a longitudinal direction of the wires, and a cover made of a harder material than the rubber stopper and accommodating the rubber stopper. The rubber stopper integrally has a sheath sealing portion having an inner peripheral surface that comes into contact with an outer peripheral surface of the sheath, and a wire sealing portion including plural insertion holes to which the wires are inserted. The cover integrally has a sheath holding portion that crimps and holds an uncovered portion of the sheath that is not covered by the rubber stopper, and a rubber stopper holding portion that crimps and holds the rubber stopper.

4 Claims, 8 Drawing Sheets

(56) References Cited

U.S. PATENT DOCUMENTS

2018/0366934 A1  12/2018  Komori et al.
2019/0351845 A1* 11/2019  Toyoshima ............. H02G 3/22

* cited by examiner

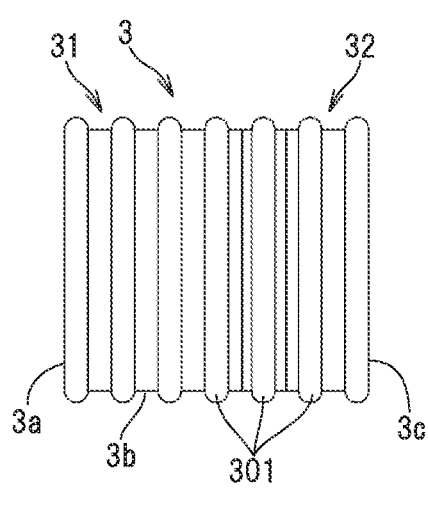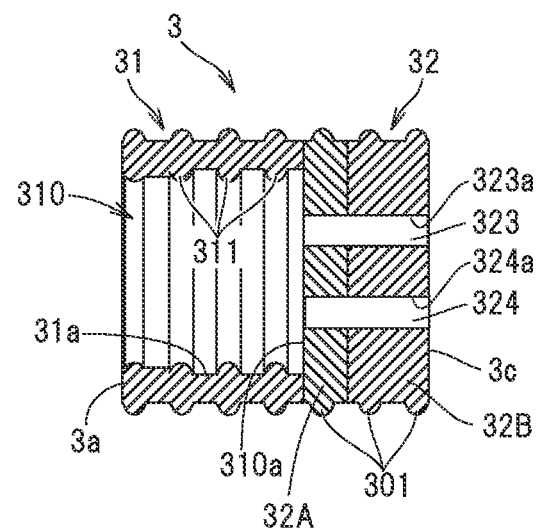

WIRE HARNESS AND CABLE WATERPROOF STRUCTURE

CROSS-REFERENCE TO RELATED APPLICATION

The present patent application claims the priority of Japanese patent application No. 2021-145214 filed on Sep. 7, 2021, and the entire contents thereof are hereby incorporated by reference.

TECHNICAL FIELD

The present invention relates to a wire harness and a cable waterproof structure.

BACKGROUND ART

Conventionally, sealing structures configured to suppress water ingress into a sheath of a cable including multiple wires coated with the sheath have been known as described in Patent Literature 1 and Patent Literature 2. The sealing structure described in Patent Literature 1 is composed of a rubber stopper (i.e., rubber plug) being outer-fitted (i.e., exterior-fitted) at an end of the sheath, an inner support member including a support located on the inside of the sheath, and an outer support member being outer-fitted with the rubber stopper and pressing the rubber stopper so that the sheath is held between the support of the inner support member and the rubber stopper.

The sealing structure described in Patent Literature 2 is composed of a rubber stopper being outer-fitted at an end of a sheath, a cap being outer-fitted to the rubber stopper, and a holding portion that holds the sheath. The holding portion has a rubber stopper holding portion (i.e., mating portion) that engages with the cap. The rubber stopper includes the rubber stopper hand holding portion that engages with the cap, thereby suppressing movement in a direction of disengagement from the end of the sheath.

CITATION LIST

Patent Literature

Patent Literature 1: JP2017-93185A
Patent Literature 2: JP2017-112756A

SUMMARY OF THE INVENTION

If such cables are used, for example, to connect a car body side to a wheel side in a vehicle, the cable is repeatedly bent (i.e., flexed) due to a vertical motion of the car body relative to the wheel and the wheel steering. During this flexion, if a slip occurs between the sheath and the rubber stopper, the rubber stopper may wear and decrease its sealing ability. In the sealing structure described in Patent Literature 2, the holding portion engages with the cap to suppress the relative movement between the sheath and the rubber stopper. However, if the cap tilts against the holding portion when the cable is bent, a slight slip between the sheath and the rubber stopper occurs. The accumulation of wear due to long-term use may reduce the sealing property.

In light of the foregoing, it is an object of the present invention to provide a wire harness and a cable waterproof structure that can reduce the wear of a rubber stopper and maintain the sealing property for a long period of time.

To solve the aforementioned problems, one aspect of the present invention provides a wire harness, comprising:
 a cable comprising wires coated with a sheath;
 a rubber stopper that covers an end of the sheath together with a portion in a longitudinal direction of the wires; and
 a cover comprising a harder material than the rubber stopper and accommodating the rubber stopper,
 wherein the rubber stopper integrally comprises a sheath sealing portion having an inner peripheral surface that comes into contact with an outer peripheral surface of the sheath, and a wire sealing portion including plural insertion holes to which the wires are inserted,
 wherein the cover integrally comprises a sheath holding portion that crimps and holds the sheath at an uncovered portion that is not covered by the rubber stopper, and a rubber stopper holding portion that crimps and holds the rubber stopper.

To solve the aforementioned problems, another aspect of the present invention provides a cable waterproof structure configured to suppress water ingress from an end of a sheath of a cable including wires derived from an end of the sheath, comprising:
 a rubber stopper; and
 a cover configured to accommodate the rubber stopper,
 wherein the rubber stopper integrally comprises a sheath sealing portion having an inner peripheral surface that comes into contact with an outer peripheral surface of the sheath, and a wire sealing portion including an inner peripheral surface that comes into contact with respective outer peripheral surfaces of the wires,
 wherein the cover integrally comprises a sheath holding portion that crimps and holds the sheath at an uncovered portion that is not covered by the rubber stopper, and a rubber stopper holding portion that crimps and holds the rubber stopper.

Effects of the Invention

According to the present invention, it is possible to provide a wire harness and a cable waterproof structure that can reduce the wear of a rubber stopper and maintain the sealing property for a long period of time.

BRIEF DESCRIPTION OF DRAWINGS

FIG. 9A is a side view of a rubber stopper in a modified example.

FIG. 9B is a cross-sectional view of the rubber stopper in the modified example.

BEST MODE FOR CARRYING OUT THE INVENTION

Embodiment

A wire harness and a cable waterproof structure in the embodiment of the present invention will be described below in conjunction with FIG. 1A to FIG. 8.

Figure 1A:
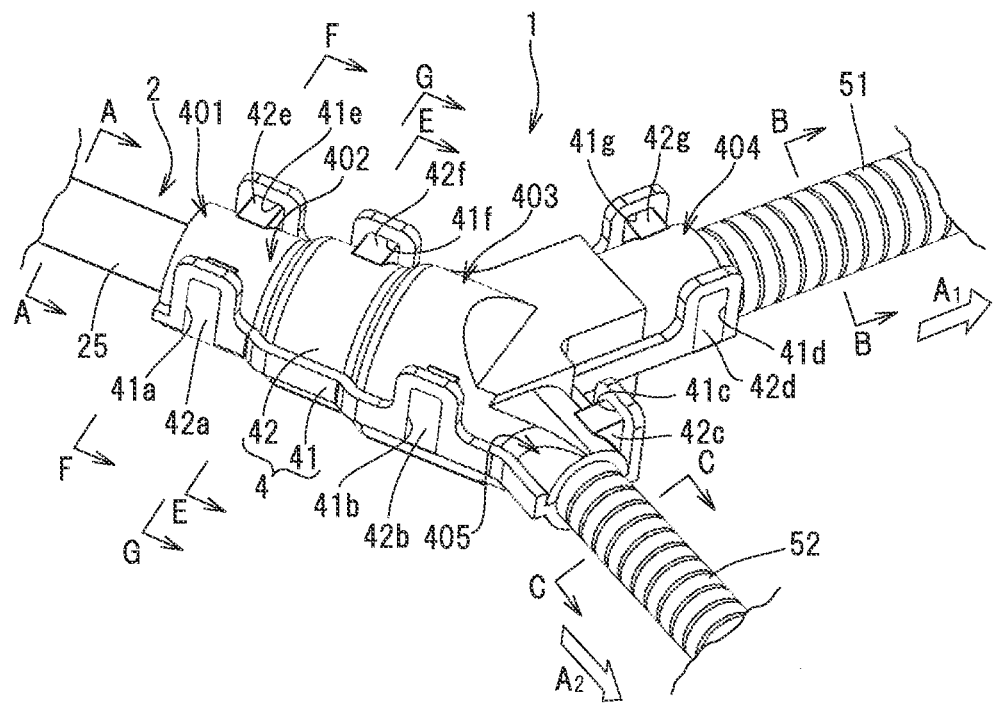
FIG. 1A is a perspective view showing a branching portion that is an essential part of a wire harness in an embodiment of the present invention.
Figure 1B:
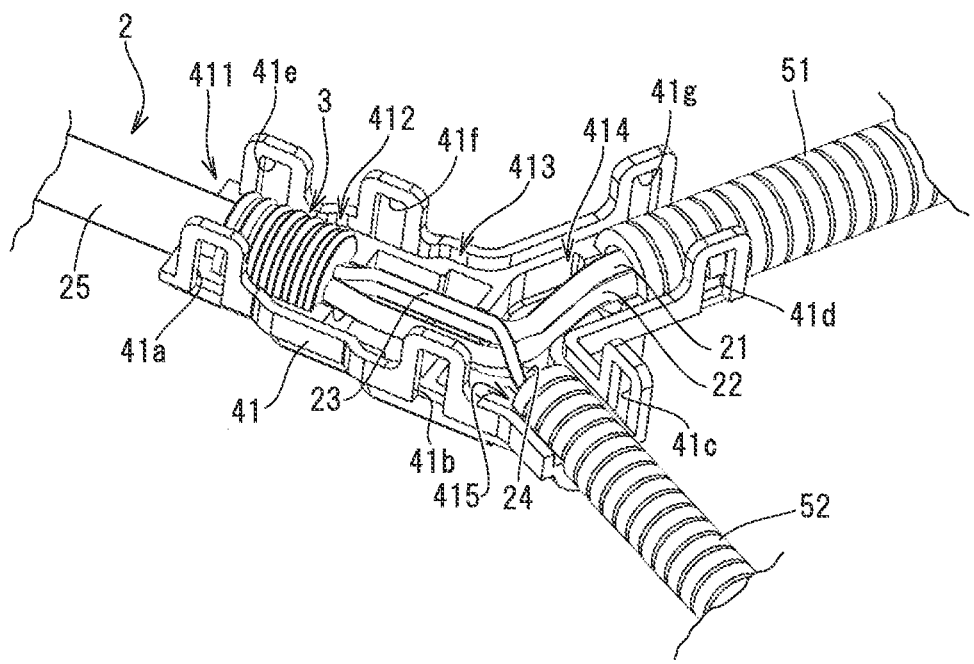
FIG. 1B is a perspective view showing the inside of a cover with a cover lid body being removed.
Figure 2:
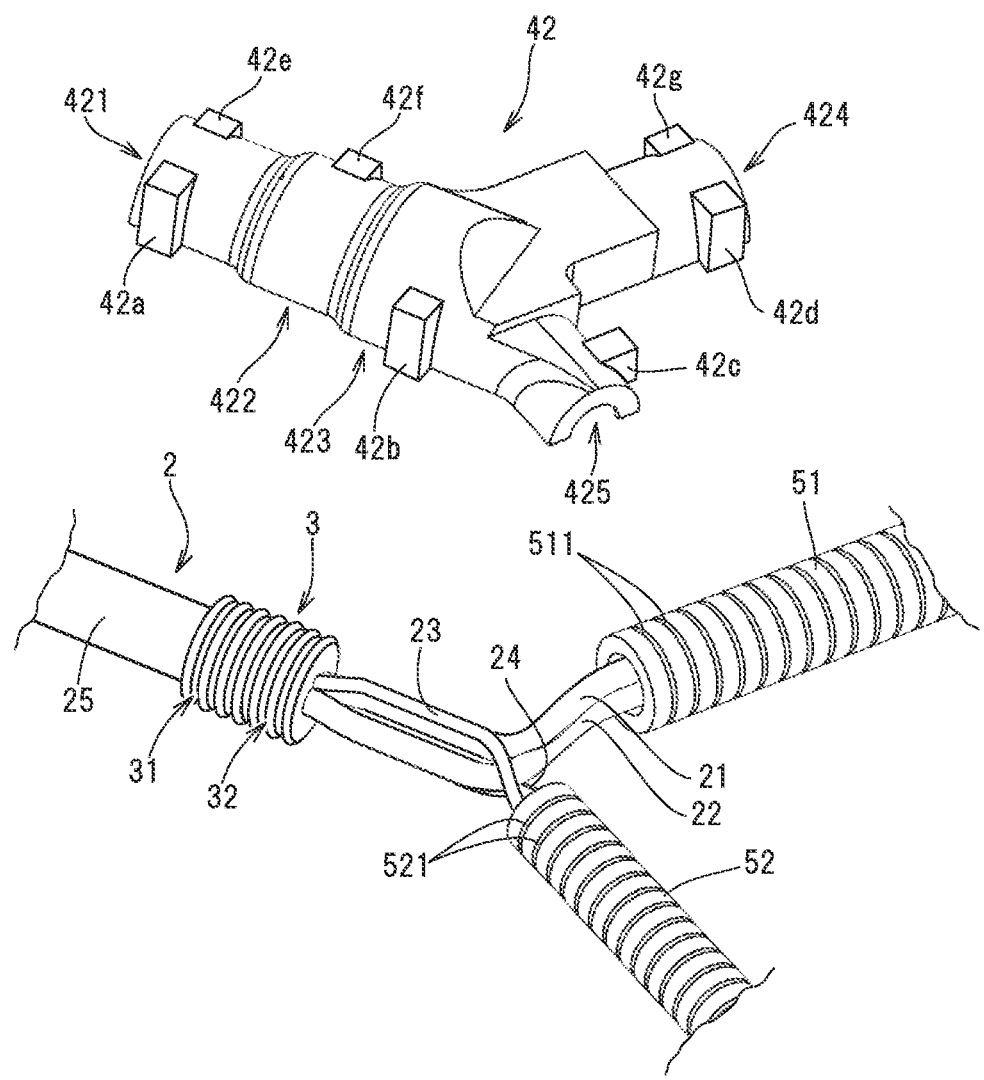
FIG. 2 is an exploded view of the wire harness.
Figure 2:
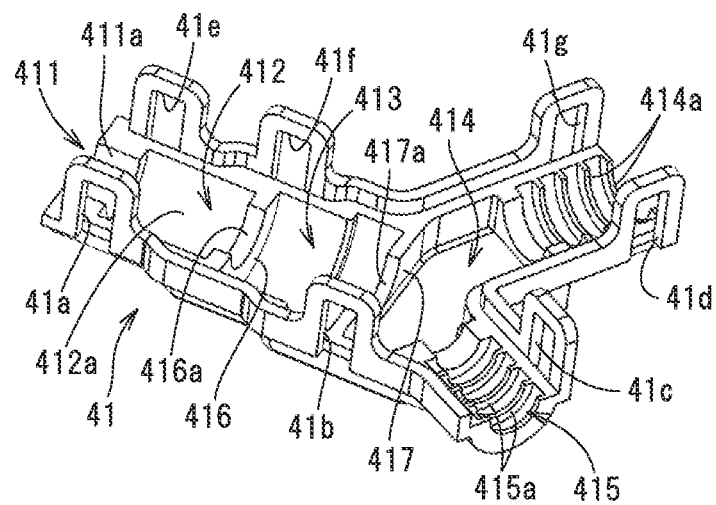
Figure 3:
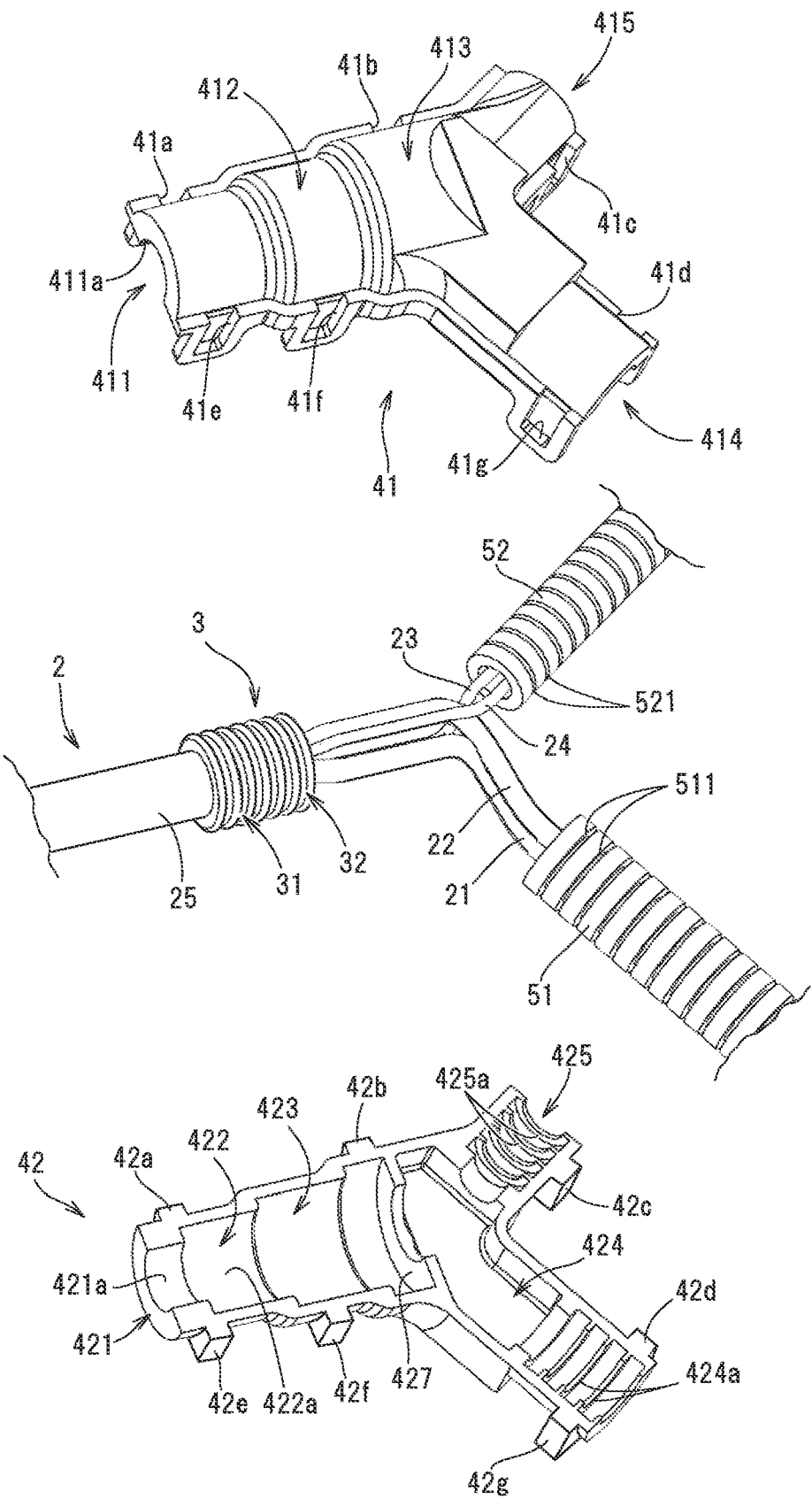
FIG. 3 is an exploded view of the wire harness as viewed from a direction different from the direction shown in FIG. 2.
Figure 4A:
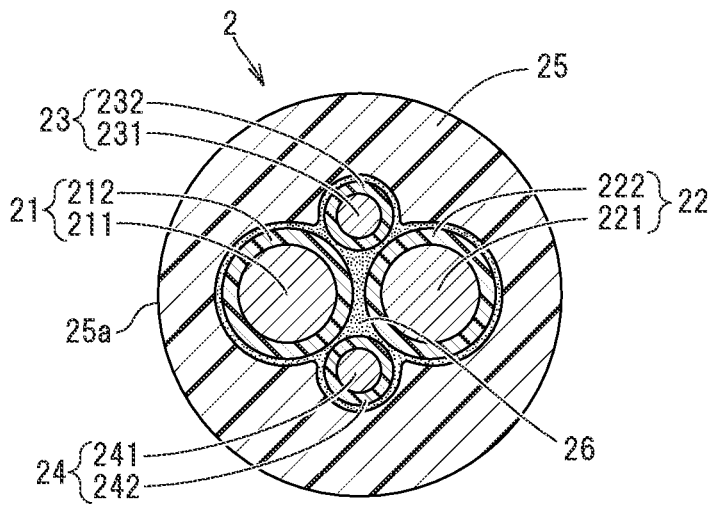
FIG. 4A is a cross-sectional view taken along a line A-A in FIG. 1A.
Figure 4B:
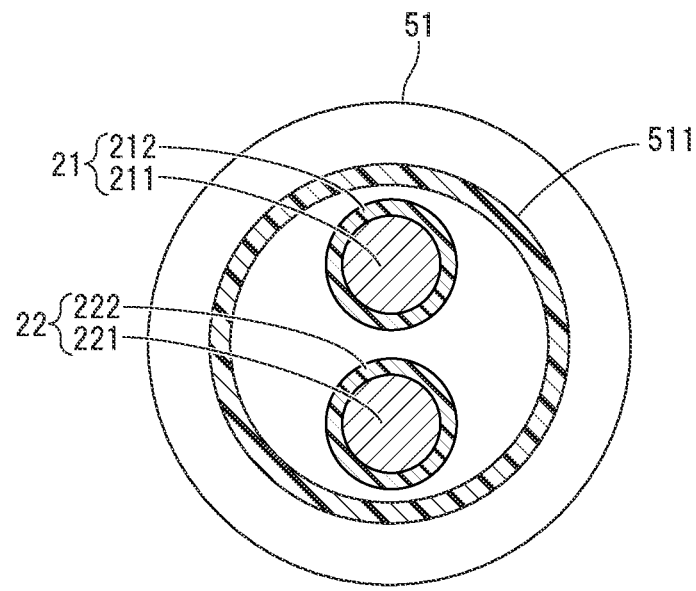
FIG. 4B is a cross-sectional view taken along a line B-B in FIG. 1A.
Figure 4C:
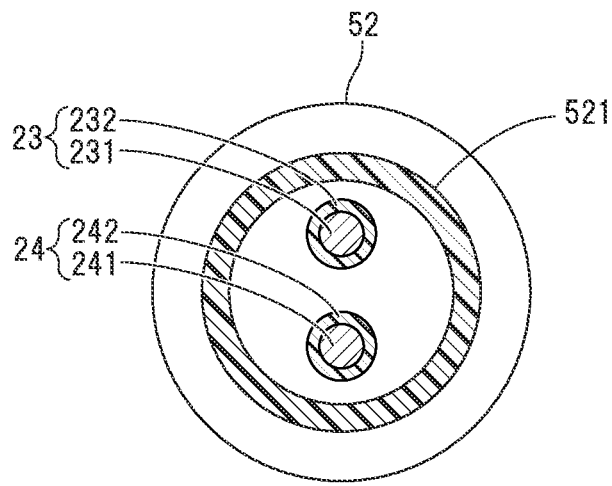
FIG. 4C is a cross-sectional view taken along a line C-C in FIG. 1A.

FIG. 1A is a perspective view showing a branching portion that is an essential part of a wire harness 1 in an embodiment of the present invention. FIG. 1B is a perspective view showing the inside of a cover with a cover lid body being removed. FIG. 2 is an exploded view of the wire harness 1. FIG. 3 is an exploded view of the wire harness 1 as viewed from a direction different from the direction shown in FIG. 2. FIG. 4A is a cross-sectional view taken along a line A-A in FIG. 1A. FIG. 4B is a cross-sectional view taken along a line B-B in FIG. 1A. FIG. 4C is a cross-sectional view taken along a line C-C in FIG. 1A.

The wire harness 1 is composed of a cable 2 including first to fourth electric wires (also referred to as "wires") 21 to 24 and a sheath 25, a rubber stopper 3 that stops water ingress at one end of the sheath 25, a cover 4 that houses the rubber stopper 3, and first and second protective tubes 51, 52. The wire harness 1 is, for example, installed on a vehicle, and used to connect a control unit of a braking system to an electric brake device and an ABS (anti-lock braking system) sensor. The electric brake device is activated by the electric current supplied by the control device and produces a braking force to brake wheels. The ABS sensor is a magnetic sensor that detects a magnetic field of a magnetic encoder mounted on a rotating member of a hub supporting the wheels.

As shown in FIG. 4A, cable 2 is configured in such a manner that the first to fourth wires 21 to 24 are covered together by the sheath 25. The cable 2 has a solid structure with the sheath 25 being extruded by solid extrusion around the wires 21 to 24. The first to fourth wires 21 to 24 are insulated electric wires respectively including center conductors 211, 221, 231, 241 coated with insulators 212, 222, 232, 242.

Each of the center conductors 211, 221, 231, 241 is a twisted wire composed of plural strands (i.e., elementary wires) of a copper alloy or an aluminum alloy being twisted together. Each of the insulators 212, 222, 232, 242 is composed of cross-linked PE (polyethylene) or flame-resistant cross-linked PE (polyethylene), The sheath 25 is composed of, e.g., PU (polyurethane) and is formed to enter valleys between the first and second wires 21, 22 and the third and fourth wires 23, 24. An outer peripheral surface 25a of the sheath 25 in a longitudinal cross-section of the cable 2 is circular.

The first and second wires 21, 22, for example, are power lines that provide electric power for the operation of the electric brake device. The third and fourth wires 23, 24, for example, are signal lines that transmit signals for the ABS sensor. The first and second wires 21, 22 as the power lines are larger in outer diameter than the third and fourth wires 23, 24 as the signal lines. Around the first to fourth wires 21 to 24, lubricants 26 are provided to lubricate the movements of the first to fourth wires 21 to 24 in the sheath 25 when the cable 2 is bent. The lubricants 26 are fine powders, such as talc and silica. The lubricants 26 may be fibrous.

The first to fourth wires 21 to 24 are derived from the sheath 25 inside the cover 4 and branch into first and second directions. The first and second wires 21, 22 constitute a first group of wires derived from the cover 4 in the first direction, and one or more portions between the cover 4 and a connection target (an object to be connected, e.g., the electric brake device) are covered by a first protective tube 51. The third and fourth wires 23, 24 constitute a second group of wires derived from the cover 4 in the second direction, and one or more portions between the cover 4 and a connection target (an object to be connected, e.g., the ABS sensor) are covered by a second protective tube 52. In FIG. 1A, the first direction is indicated by an arrow $A_1$, and the second direction is indicated by an arrow $A_2$. The first and second protective tubes 51, 52 are corrugated tubes made of resin.

Figure 5A:
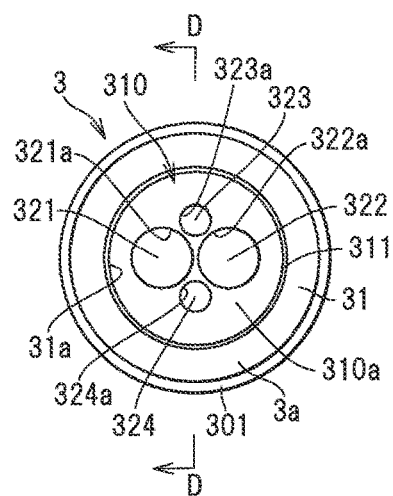
FIG. 5A is a diagram showing one axial end surface of a rubber stopper.
Figure 5B:
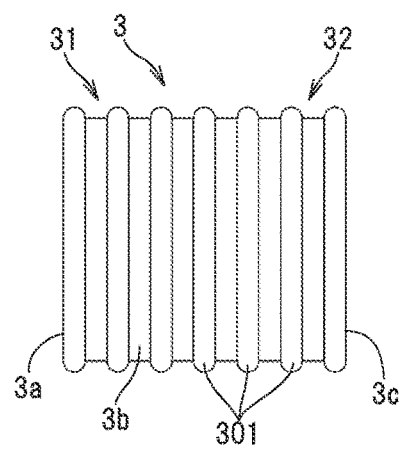
FIG. 5B is a diagram showing an outer peripheral surface of the rubber stopper.
Figure 5C:
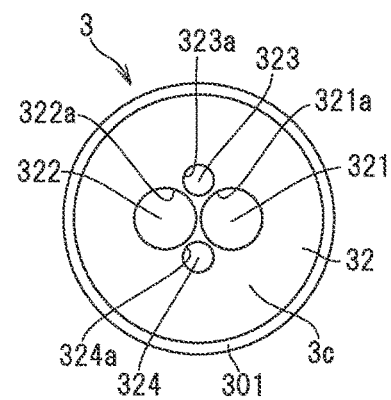
FIG. 5C is a diagram showing the other axial end surface of the rubber stopper.
Figure 5D:
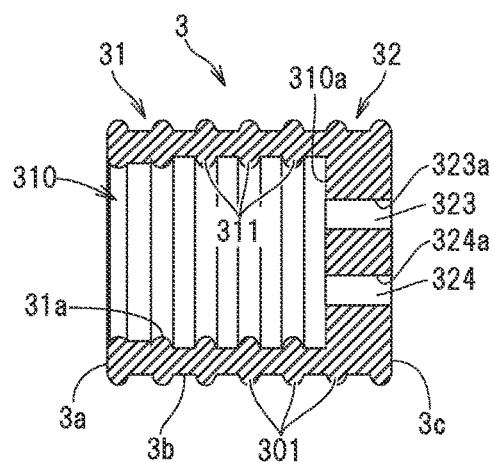
FIG. 5D is a cross-sectional view taken along the line D-D in FIG. 5A.
Figure 5E:
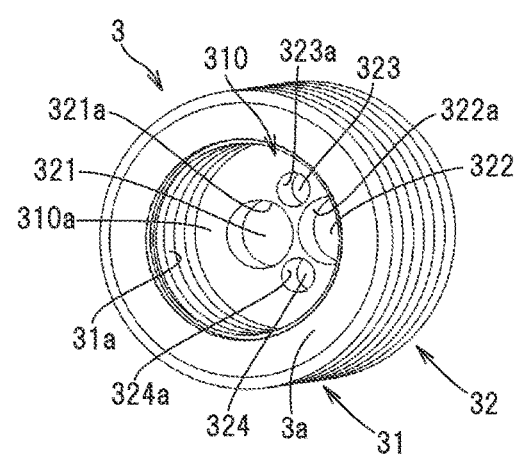
FIG. 5E is a perspective view of the rubber stopper.

FIG. 5A is a diagram showing a first axial end surface 3a of the rubber stopper 3, into which the sheath 25 is inserted. FIG. 5B is a diagram showing an outer peripheral surface 3b of the rubber stopper 3. FIG. 5C is a diagram showing a second axial end surface 3c of the rubber stopper 3, from which the first to fourth wires 21 to 24 are derived. FIG. 5D is a cross-sectional view taken along the line D-D in FIG. 5A. FIG. 5E is a perspective view of the rubber stopper 3, which is viewed obliquely with respect to an axial direction from the first axial end surface 3a.

The rubber stopper 3 is composed of a rubber material such as ethylene propylene diene rubber (EPDM) and silicone rubber, and covers the ends of the sheath 25 along with portions in longitudinal directions of the first to fourth wires 21 to 24. The rubber stopper 3 has a sheath sealing portion 31 with an inner peripheral surface 31a that elastically contacts with the outer peripheral surface 25a of the sheath 25, and a wire sealing portion 32 with first to fourth holes 321 to 324 through which the first to fourth wires 21 to 24 are passed, respectively, as one piece.

The outer peripheral surface 3b of the rubber stopper 3, which contacts an inner peripheral surface of the cover 4, is formed with plural ribs 301. Of the plural ribs 301, some ribs 301 are formed on an outer periphery of the sheath sealing portion 31, while others are formed on an outer periphery of the wire sealing portion 32. Each rib 301 is formed in an annular shape along a circumferential direction of the rubber stopper 3.

The sheath sealing portion 31 has a cylinder shape in which a housing hole 310 for housing the end of the sheath 25 is formed at its center part. The inner peripheral surface 31a of the sheath sealing portion 31 is formed with plural ribs 311 that extend in the circumferential direction. Each rib 311 is formed in an annular shape along a circumferential direction of the sheath sealing portion 31.

First to fourth insertion holes 321 to 324 are open at one end at a bottom surface 310a of the housing hole 310 and at the other end at the second axial end surface 3c of the rubber stopper 3. The first to fourth insertion holes 321 to 324 are formed independently of each other, without any connection (i.e., communication) between them. An inner diameter of each of the first to fourth insertion holes 321 to 324 is slightly smaller than an outer diameter of each of the first to fourth wires 21 to 24.

The cover 4 is composed of a harder material than the rubber stopper 3 and the sheath 25 and is constituted from a pair of cover members. In the present embodiment, the cover 4 has a cover main body 41, and a cover lid body 42 as a pair of cover members. Insulators such as PBT (polybutylene terephthalate) and nylon can be used as materials for the cover main body 41 and the cover lid body 42. The cover main body 41 and the cover lid body 42 are secured to each other with engaging holes 41a to 41g in the cover main body 41 being engaged with engaging protrusions 42a to 42g in the cover lid body 42. Alternatively, the cover main body 41 may have multiple engaging protrusions and the cover lid body 42 may have multiple engaging holes. The cover 4 can also be made of metal, or a hard material made by adding metal powder or filler to the insulator.

The cover 4 is held by tightening the sheath 25 and the rubber stopper 3 by sandwiching the sheath 25 and the rubber stopper 3 between the cover main body 41 and the cover lid body 42. As a configuration for this, the cover 4 has a sheath holding portion 401, which tightens (e.g., crimps) and holds the sheath 25 at an uncovered portion that is not covered by the rubber stopper 3, and a rubber stopper holding portion 402, which tightens (e.g., crimps) and holds the rubber stopper 3, as shown in FIG. 1A. The sheath holding portion 401 and the rubber stopper holding portion 402 are adjacent along an axial direction of the rubber stopper 3.

The sheath holding portion 401 is composed of a main body-side sheath holding portion 411 of the cover main body 41, and a lid-side sheath holding portion 421 of the cover lid body 42. The main body-side sheath holding portion 411 and the lid-side sheath holding portion 421 are half-circular fan-shaped walls, respectively, when viewed from the longitudinal direction of the cable 2, and half-circular notches 411a, 421a with an inner diameter corresponding to the outer diameter of the sheath 25 are formed at the center. An inner diameter of an insertion hole 40 (see FIG. 7 to be described below) for the cable 2 in the cover 4, which is constituted from a combination of the notches 411a, 421a, is formed slightly smaller than the outer diameter of the sheath 25. The sheath 25 is pinched between the main body-side sheath holding portion 411 and the lid-side sheath holding portion 421, and the relative movement to the cover 4 is restricted.

The rubber stopper holding portion 402 is composed of the main body-side rubber stopper holding portion 412 of the cover main body 41, and the lid-side rubber stopper holding portion 422 of the cover lid body 42. Each of the main body-side rubber stopper holding portion 412 and the lid-side rubber stopper holding portion 422 is formed in a half-cut cylindrical shape, and the main body-side rubber stopper holding portion 412 and the lid-side rubber stopper holding portion 422 are combined to form the cylindrical shape rubber stopper holding portion 402. The outer peripheral surface 3b of the rubber stopper 3 contacts the inner peripheral surfaces 412a, 422a of the main body-side rubber stopper holding portion 412 and the lid-side rubber stopper holding portion 422. The inner diameter of the rubber stopper holding portion 402 is slightly smaller than the outer diameter of the rib 301 of the rubber stopper 3 in its natural state.

The length of the rubber stopper holding portion 402 in the longitudinal direction of the cable 2 is longer than the length of the sheath holding portion 401 in the longitudinal direction of the cable 2. This ensures the sealing property appropriately while suppressing the decrease in bendable length of the cable 2.

The cover 4 also a wire holding portion 403 for holding the first to fourth wires 21 to 24 derived from the rubber stopper 3 along an alignment direction of the sheath holding portion 401 and the rubber stopper holding portion 402, a first wire deriving portion 404 extending in the first direction, and a second wire deriving portion 405 extending in the second direction. The wire holding portion 403 accommodates the first to fourth wires 21 to 24, and extends in the same direction as the alignment direction of the sheath holding portion 401 and the rubber stopper holding portion 402. The first wire deriving portion 404 accommodates the first and second wires 21, 22, and derives the first and second wires 21, 22 from the cover 4 toward the first direction. The second wire deriving portion 405 accommodates the third and fourth wires 23, 24, and derives the third and fourth wires 23, 24 from the cover 4 toward the second direction.

The wire holding portion 403 is composed of the main body-side wire holding portion 413 of the cover main body 41, and the lid-side wire holding portion 423 of the cover lid body 42. The first wire deriving portion 404 is composed a first main body-side wire deriving portion 414 of the cover main body 41, and a first lid-side wire deriving portion 424 of the cover lid body 42. The second wire deriving portion 405 is composed a second main body-side wire deriving portion 415 of the cover main body 41, and a second lid-side wire deriving portion 425 of the cover lid body 42.

The cover main body 41 has a semi-circular fan-shaped partition wall 416 between the main body-side rubber stopper holding portion 412 and the main body-side wire holding portion 413, as shown in FIG. 2. The rubber stopper 3 is located between the main body-side sheath holding portion 411 and the partition wall 416. The cover main body 41 also has a semi-circular fan-shaped support wall 417 for supporting the first to fourth wires 21 to 24 between the first main body-side wire deriving portion 414 and the second main body-side wire deriving portion 415. At the center of the support wall 417, a semi-circular notch 417a is formed.

As shown in FIG. 3, the cover lid body 42 has a semi-circular fan-shaped support wall 427 for supporting the first to fourth wires 21 to 24 between the lid-side wire holding portion 423 and the first lid-side wire deriving portion 424 and the second lid-side wire deriving portion 425. At the center of the support wall 427 is a semi-circular notch, 427a. By this support wall 427 and the support wall 417 of the cover main body 41, the first to fourth wires 21 to 24 are inserted through the notches 417a, 427a to be bundled between the wire holding portion 403 and the first and second wire deriving portions 404, 405.

At the first main body-side electric wire deriving portion 414 of the cover main body 41 and the first lid-side wire deriving portion 424 of the cover lid body 42, plural engaging protrusions 414a, 424a are formed, respectively, which are configured to engage with plural valleys 511 of the first protective tube 51. In addition, at the second main body-side electric wire deriving portion 415 of the cover main body 41 and at the second lid-side wire deriving portion 425 of the cover lid body 42, plural protrusions 415a, 425a are formed, respectively, which are configured to engage with plural valleys 521 of the second protective tube 52. The first protective tube 51 is pinched by the first main body-side wire deriving portion 414 and the first lid-side wire deriving portion 424. The second protective tube 52 is pinched by the second main body-side wire deriving portion 415 and the second lid-side wire deriving portion 425.

Figure 6:
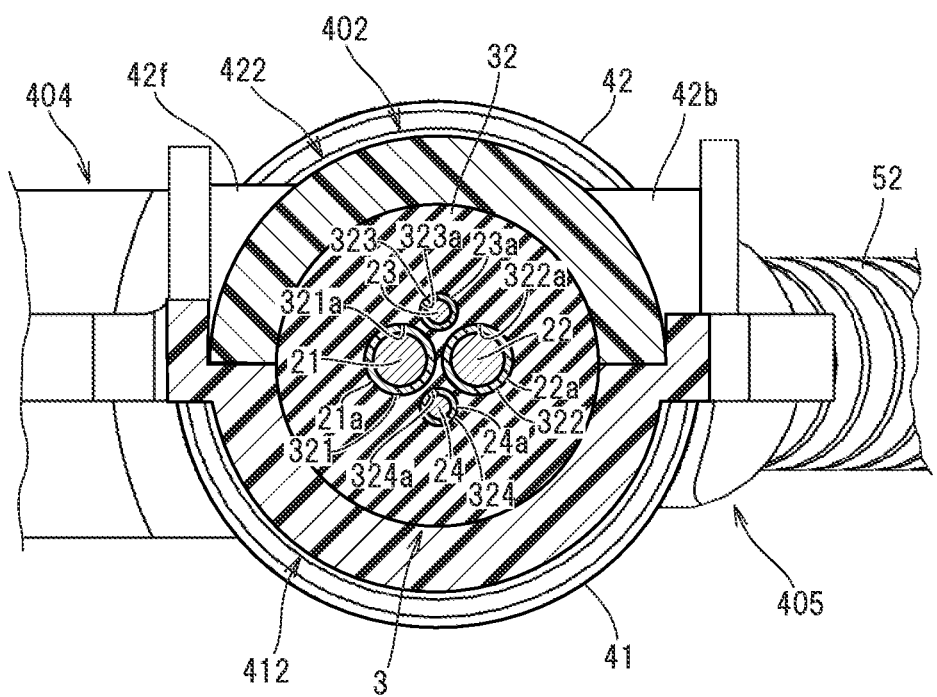
FIG. 6 is a cross-sectional view taken along a line E-E in FIG. 1A, which includes a wire sealing portion of the rubber stopper.

FIG. 6 is a cross-sectional view taken along a line E-E in FIG. 1A, which includes the wire sealing portion 32 of the rubber stopper 3. The inner peripheral surfaces 321a, 322a, 323a, 324a of the first to fourth insertion holes 321 to 324 elastically contact the outer peripheral surfaces 21a, 22a, 23a, 24a of the first to fourth wires 21 to 24, respectively. This suppresses water from entering the inside of the sheath 25 through the first to fourth insertion holes 321 to 324.

The first to fourth wires 21 to 24 are bundled by the support wall 417 of the cover main body 41 and the support wall 427 of the cover lid body 42, so that the first to fourth wires 21 to 24 in the wire holding portion 403 are linear. As a result, it is possible to suppress the generation of a gap between the inner peripheral surfaces 321a, 322a, 323a, 324a of the first to fourth insertion holes 321 to 324 and the outer peripheral surfaces 21a, 22a, 23a, 24a of the first to fourth wires 21 to 24.

Figure 7:
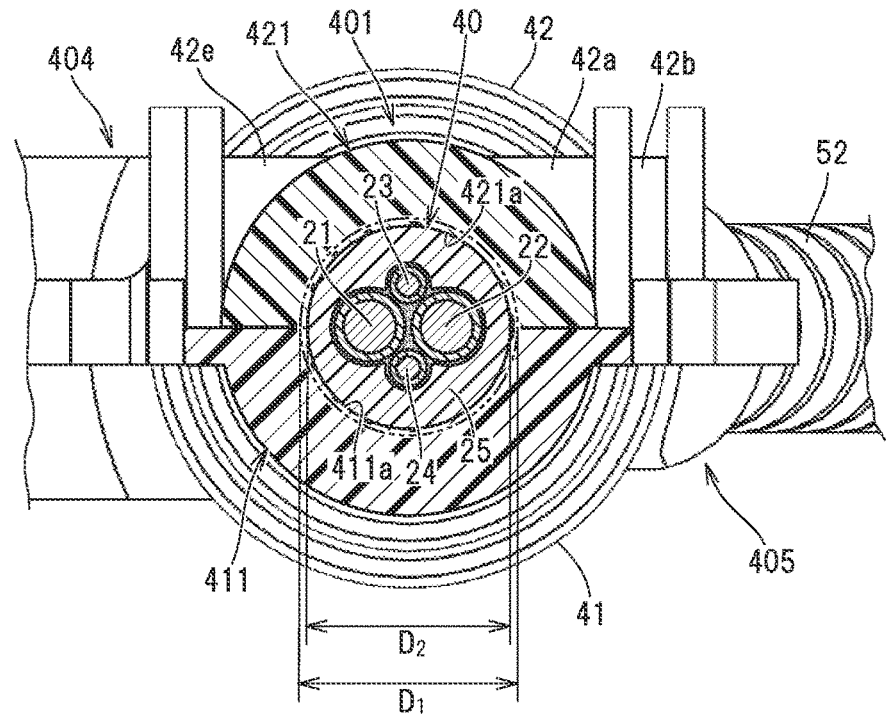
FIG. 7 is a cross-sectional view taken along a line F-F in FIG. 1A, which includes a sheath holding portion.

FIG. 7 is a cross-sectional view taken along a line F-F in FIG. 1A, which includes the sheath holding portion 401. FIG. 7 shows the outer diameter of the sheath 25 in its natural state before being held by the sheath holding portion 401 by a virtual line (two-point chain line). The sheath 25 is compressed to a reduced diameter by being pinched between the main body-side sheath holding portion 411 and the lid-side sheath holding portion 421. When the outer diameter of the sheath 25 is $D_1$ before being held in the sheath holding portion 401 and the outer diameter of the sheath 25 held by the sheath holding portion 401 is $D_2$, this difference ($D_1-D_2$) is a crimping amount of the sheath 25 in the sheath holding portion 401 by the cover 4.

Figure 8:
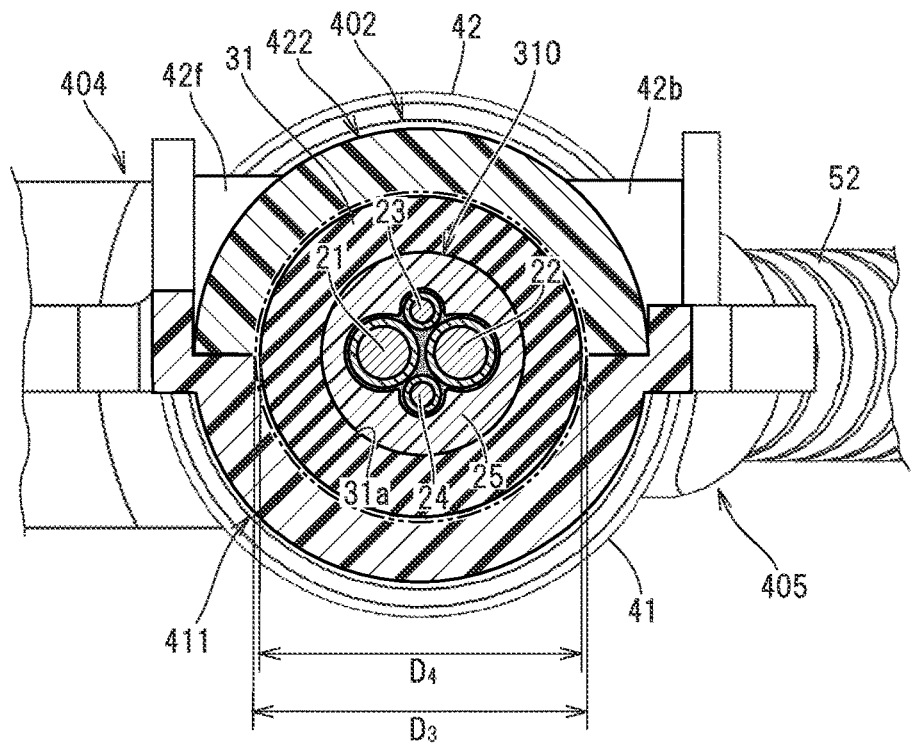
FIG. 8 is a cross-sectional view taken along a line G-G in FIG. 1A, which includes a sheath sealing portion of the rubber stopper and a rubber stopper holding portion of the cover.

FIG. 8 is a cross-sectional view taken along a line G-G in FIG. 1A, which includes the sheath sealing portion 31 of the rubber stopper 3 and the rubber stopper holding portion 402 of the cover 4. FIG. 8 shows the outer diameter of the rib 301 of the rubber stopper 3 in its natural state before being held by the rubber stopper holding portion 402 by a virtual line (two-point chain line). The rubber stopper 3 is compressed to a reduced diameter by being pinched between the main body-side rubber stopper holding portion 412 and the lid-side rubber stopper holding portion 422. When the outer diameter of the sheath sealing portion (the rib 301) of the rubber stopper 3 is $D_3$ before being held in the rubber stopper holding portion 402 and the outer diameter of the sheath sealing portion (the rib 301) of the rubber stopper 3 held by the rubber stopper holding portion 402 is $D_4$, this difference ($D_3-D_4$) is a crimping amount of the sheath 25 in the sheath holding portion 401 by the cover 4.

The crimping amount ($D_1-D_2$) of the sheath 25 in the sheath holding portion 401 by the cover 4 is greater than the crimping amount ($D_3-D_4$) of the sheath sealing portion 31 of the rubber stopper 3 in the rubber stopper holding portion 402 by the cover 4. This ensures that the tightening force of the sheath 25 in the sheath holding portion 401 by the cover 4 is greater than the tightening force of the rubber stopper 3 in the rubber stopper holding portion 402 by the cover 4 and that the sheath 25 is held firmly by the cover 4.

Functions and Effects of the Embodiment

According to the present embodiment, the cover 4 has the sheath holding portion 401 and the rubber stopper holding portion 402 integrally (as one piece) so that when the cable 2 is bent, slip between the rubber stopper 3 and the sheath 25 can be suppressed. This means that the sheath 25 is held by the sheath holding portion 401 and the rubber stopper 3 is held by the rubber stopper holding portion 402 provided integrally with the sheath holding portion 401. Therefore, the external forces acting on the cable 2 outside the cover 4 are hardly transferred to the sheath 25, which is housed in the housing hole 310 of the rubber stopper 3, thus suppressing the slip between the rubber stopper 3 and the sheath 25. This reduces wear of the rubber stopper 3 and allows the sealing property of the rubber stopper 3 to be maintained for a long time. Also, the sheath 25 is held in the sheath holding portion 401 to suppress the water ingress into the cover 4 through a clearance between the outer peripheral surface 25a of the sheath 25 and the sheath holding portion 401.

Modified Example

FIG. 9A is a side view of a rubber stopper 3A in a modified example. FIG. 9B is a cross-sectional view of the rubber stopper 3A in the modified example. In this rubber stopper 3A, a first portion 32A closer to the sheath sealing portion 31 (i.e., sheath sealing portion-side portion 32A) in the wire sealing portion 32 is made of a rubber material, which is harder than the other portion 32B in the wire sealing portion 32 and the sheath sealing portion 31. According to this modified example, the sheath sealing portion-side portion 32A makes it easier to insert the first to fourth wires 21 to 24 into the insertion holes 321 to 324, while the second portion 32B ensures the sealing property of the wire sealing portion 32. The rubber stopper 3A in this configuration can be manufactured by a two-color molding process.

SUMMARY OF THE EMBODIMENT

Next, the technical ideas grasped from the embodiment will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

According to the feature [1], a wire harness 1 includes a cable 2 comprising wires 21 to 24 coated with a sheath 25, a rubber stopper 3 that covers an end of the sheath 25 together with a portion in a longitudinal direction of the wires 21 to 24, and a cover 4 comprising a harder material than the rubber stopper 3 and accommodating the rubber stopper, wherein the rubber stopper 3 integrally comprises a sheath sealing portion 31 having an inner peripheral surface 31a that comes into contact with an outer peripheral surface 25a of the sheath 25, and a wire sealing portion 32 including plural insertion holes 321 to 324 to which the wires 21 to 24 are inserted, wherein the cover 4 integrally comprises a sheath holding portion 401 that crimps and holds an uncovered portion of the sheath 25 that is not covered by the rubber stopper 3, and a rubber stopper holding portion 402 that crimps and holds the rubber stopper 3.

According to the feature [2], in the wire harness 1 defined by the feature [1], the cover 4 comprises a pair of cover members 41, 42, and crimps the sheath 25 and the rubber stopper 3 by pinching the sheath 25 and the rubber stopper 3 between the pair of cover members 41, 42.

According to the feature [3], in the wire harness 1 defined by the feature [1] or [2], a crimping amount of the sheath 25 in the sheath holding portion 401 by the cover 4 is greater than a crimping amount of the sheath sealing portion 402 in the rubber stopper holding portion 402 by the cover 4.

According to the feature [4], in the wire harness defined by any one of the features [1] to [3], the wires 21 to 24 comprise a first group of wires 21, 22 derived from the cover 4 toward a first direction, and a second group of wires 23, 24 derived from the cover 4 toward a second direction different from the first direction, and the rubber stopper 3 includes insertion holds 321 to 324 to which the first group of wires 21, 22 and the second group of wires 23, 24 are inserted respectively.

According to the feature [5], in the wire harness defined by the feature [4], the cover 4 further comprises a wire holding portion 403 that holds the wires 21 to 24 derived from the rubber stopper 3 along an alignment direction of the sheath holding portion 401 and the rubber stopper holding portion 402, a first wire holding portion 404 that accommodates the first group of wires 21, 22, extends in the first direction, and derives the first group of wires 21, 22 toward the first direction, and a second wire holding portion 405 that accommodates the second group of wires 23, 24, extends in the second direction, and derives the second group of wires 23, 24 toward the second direction.

According to the feature [6], a cable waterproof structure configured to suppress water ingress from an end of a sheath 25 of a cable 2 including wires 21 to 24 derived from an end of the sheath 25, comprising: a rubber stopper 3; and a cover 4 configured to accommodate the rubber stopper 3, wherein the rubber stopper 3 integrally comprises a sheath sealing portion 31 having an inner peripheral surface 31a that comes into contact with an outer peripheral surface 25a of the sheath 25, and a wire sealing portion 32 including an inner peripheral surface (or inner peripheral surfaces) 321a, 322a, 323a, 324a that comes into contact with respective outer peripheral surfaces 21a, 22a, 23a, 24a of the wires 21 to 24, wherein the cover 4 integrally comprises a sheath holding portion 401 that crimps and holds the sheath 25 at an uncovered portion that is not covered by the rubber stopper 3, and a rubber stopper holding portion 402 that crimps and holds the rubber stopper 3.

Although the embodiments of the present invention have been described above, the aforementioned embodiment is not to be construed as limiting the inventions according to the appended claims. Further, it should be noted that not all the combinations of the features described in the embodiments are indispensable to the means for solving the problem of the invention.

Further, the present invention can be appropriately modified and implemented without departing from the spirit thereof. For example, in the above embodiment, the case where the cover main body 41 and the cover lid body 42 are secured to each other by the plural engaging protrusions 42a to 42g being engaged with the engaging holes 41a to 41g is explained. However, the present invention is not limited thereto. For example, the cover main body 41 and the cover lid body 42 may be connected to each other by a hinge.

The invention claimed is:

1. A wire harness, comprising:
    a cable comprising wires coated with a sheath;
    a rubber stopper that covers an end of the sheath together with a portion in a longitudinal direction of the wires; and
    a cover comprising a harder material than the rubber stopper and accommodating the rubber stopper,
    wherein the rubber stopper integrally comprises a sheath sealing portion having an inner peripheral surface that comes into contact with an outer peripheral surface of the sheath, and a wire sealing portion including plural insertion holes to which the wires are inserted,
    wherein the cover comprises a pair of cover members, and integrally comprises a sheath holding portion that crimps and holds a portion of the sheath that is not covered by the rubber stopper, and a rubber stopper holding portion that crimps and holds the rubber stopper,
    wherein an outer peripheral surface of the rubber stopper is formed with plural ribs that contact the pair of cover members,
    wherein the wires comprise a first group of wires derived from the cover toward a first direction, and a second group of wires derived from the cover toward a second direction different from the first direction, and wherein the rubber stopper includes the insertion holes to which the first group of wires and the second group of wires are inserted respectively, and
    wherein the cover further comprises a wire holding portion that holds the wires derived from the rubber stopper along an alignment direction of the sheath holding portion and the rubber stopper holding portion, a first wire holding portion that accommodates the first group of wires, extends in the first direction, and derives the first group of wires toward the first direction, and a second wire holding portion that accommodates the second group of wires, extends in the second direction, and derives the second group of wires toward the second direction.

2. The wire harness according to claim 1, wherein the cover crimps the sheath and the rubber stopper by pinching the sheath and the rubber stopper between the pair of cover members.

3. The wire harness according to claim 1, wherein a crimping amount of the sheath in the sheath holding portion by the cover is greater than a crimping amount of the sheath sealing portion in the rubber stopper holding portion by the cover.

4. The wire harness according to claim 1, wherein a rubber stopper contact length of the rubber stopper holding portion is longer than a sheath contact length of the sheath holding portion.

* * * * *